United States Patent
Yamamoto (10) Patent No.: US 7,302,696 B1
(45) Date of Patent: Nov. 27, 2007

(54) SYSTEM AND METHOD TO PROVIDE AN INTERACTIVE COUPON CHANNEL A VIDEO CASTING NETWORK

(75) Inventor: Henry H. Yamamoto, Issaquah, WA (US)

(73) Assignee: Digeo, Inc., Kirkland, WA (US)

( * ) Notice: Subject to any disclaimer, the term of this patent is extended or adjusted under 35 U.S.C. 154(b) by 1091 days.

(21) Appl. No.: 09/866,558

(22) Filed: May 24, 2001

(51) Int. Cl.
- *H04N 7/16* (2006.01)
- *H04N 7/10* (2006.01)
- *H04N 7/025* (2006.01)
- *G06Q 30/00* (2006.01)
- *G07Q 1/14* (2006.01)

(52) U.S. Cl. .................... 725/23; 725/32; 725/34; 705/14

(58) Field of Classification Search ............... 725/23, 725/32–36; 705/14
See application file for complete search history.

(56) References Cited

U.S. PATENT DOCUMENTS

| | | | | |
|---|---|---|---|---|
| 4,674,041 | A * | 6/1987 | Lemon et al. ............ | 705/14 |
| 4,888,638 | A | 12/1989 | Bohn ...................... | 358/84 |
| 4,974,085 | A | 11/1990 | Campbell et al. ........ | 358/181 |
| 5,233,423 | A | 8/1993 | Jernigan et al. ......... | 358/181 |
| 5,488,423 | A * | 1/1996 | Walkingshaw et al. ... | 725/24 |
| 5,978,013 | A * | 11/1999 | Jones et al. ............. | 725/23 |
| 6,075,971 | A * | 6/2000 | Williams et al. ......... | 725/23 |
| 6,169,543 | B1 * | 1/2001 | Wehmeyer ............... | 725/47 |
| 6,223,348 | B1 | 4/2001 | Hayes et al. ............. | 725/152 |
| 6,336,098 | B1 * | 1/2002 | Fortenberry et al. ..... | 705/14 |
| 6,385,591 | B1 * | 5/2002 | Mankoff .................. | 705/14 |
| 2002/0052788 | A1 * | 5/2002 | Perkes et al. ............ | 705/14 |
| 2002/0120927 | A1 * | 8/2002 | Harada et al. ........... | 725/23 |
| 2002/0138349 | A1 * | 9/2002 | Platt ....................... | 705/14 |
| 2002/0194069 | A1 * | 12/2002 | Thakur et al. ........... | 705/14 |
| 2003/0126597 | A1 * | 7/2003 | Darby et al. ............. | 725/32 |
| 2005/0097594 | A1 * | 5/2005 | O'Donnell et al. ....... | 725/15 |

OTHER PUBLICATIONS

Web pages printed from http://www.coupons.com, 1999-2000.

* cited by examiner

*Primary Examiner*—Hunrter B. Lonsberry
(74) *Attorney, Agent, or Firm*—Darby & Darby PC; M. David Ream (57) ABSTRACT

A system and method to provide an interactive coupon channel via a video casting network. A viewer can tune to the coupon channel to search for coupons by keyword or category. The coupon channel can also be accessed through another channel, such as a shopping channel. Once a coupon is selected by the user, the coupon channel can send the coupon to another user/viewer, save, or print the coupon. The user may also directly redeem the coupon online with a merchant affiliated with the interactive television system. A notification feature can notify the user of an expiration date of the coupons. Also, coupons can be correlated with other television programming of otherwise presented via use of triggers embedded in the television programming.

32 Claims, 10 Drawing Sheets

SYSTEM AND METHOD TO PROVIDE AN INTERACTIVE COUPON CHANNEL A VIDEO CASTING NETWORK

TECHNICAL FIELD

This disclosure relates generally to a data communication network, and more particularly but not exclusively, to provide interactive transactions by way of an interactive video casting network.

BACKGROUND

An important element in the production and distribution of television programming is revenue received from manufacturers and service providers who pay to advertise and sell their products. The survival of a television program is heavily dependent on the advertising revenue that can be realized from the television program. Advertisers, in turn, rely on the ability of the television program to draw users who then become potential purchasers of the advertised products. An effective commercial is one that captures the viewer's attention in a lasting manner and that ultimately results in the purchase of goods and/or services.

One way for merchants to maximize the resultant purchases of goods and/or services is to offer special discounts through commercials and/or coupons. Coupons are often available at the merchants' place of business or arrive in the mail or newspaper. For many consumers, the purchase of goods and/or services from a particular merchant is contingent upon the discount a consumer may receive from a coupon. The logistics of finding and redeeming coupons, however, can sometimes be inefficient. Consumers may have trouble finding a coupon for a particular good or service. When consumers do come upon a coupon they desire, they may save the coupon in a drawer or purse, only to lose the coupon later. At other times, the coupons are forgotten and expire before they can be used.

In order to remedy the problem of losing and/or forgetting about coupons, some consumers may sort and organize their coupons by expiration date and/or category. Unfortunately, this can be time-consuming and may defeat the money-saving purpose of using coupons. Another problem is that many coupons that arrive in the mail do not provide for online redemption, so that a consumer who makes a purchase through the Internet cannot get the same discount that the consumer would receive at the merchant's physical location.

The above-described problems create inefficiencies for consumers, who desire to redeem their coupons, and for merchants, who spend time and money marketing coupons to attract consumers. Accordingly, improvements are needed in the way coupons are made available to consumers and in the way they are redeemed with the merchant.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a system and method to provide an interactive coupon channel are described herein. As an overview, an embodiment of the invention provides an interactive coupon channel that is available via a video casting system. The interactive coupon channel can serve as a central hub where all of a user's coupon activity is organized. In an embodiment, a user watching television can be presented with a coupon related to the content of a television program the user is watching. If indication of the user's interest in the coupon is received, the interactive coupon channel can be displayed, and the user can be presented with options for using the coupon.

Alternatively or in addition to the above scenario, the interactive coupon channel can be directly accessed when a user tunes to the channel to search for coupons by keyword or by category. The interactive coupon channel can also be accessed through another channel, such as a shopping channel. Once the user finds a desired coupon, the interactive coupon channel can, among other things, send the coupon to a user's friend, save, or print the coupon. Coupon information can also be transferred to a smart card for later redemption. In addition, electronic reminders of a coupon's expiration date can be sent to the user. Finally, if the user desires to make a purchase online, the coupon can be redeemed through a shopping channel or directly through a merchant's website.

In the following description, numerous specific details are provided, such as the description of system components in FIGS. 1-3, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
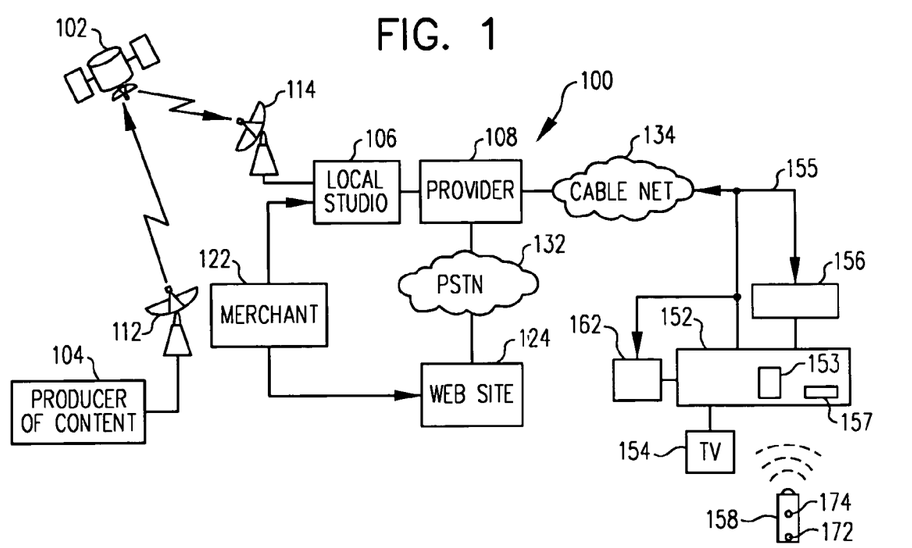
FIGS. 1-3 show examples of interactive video casting systems that can implement an embodiment of the invention.

FIG. 1 shows an example arrangement of an interactive video casting system 100 in accordance with an embodiment of the invention. A production company 104 produces programming content for transmission to viewers. The transmission is sent via satellite transmission transceiver 112 over an uplink channel to a satellite 102. The satellite 102 then transmits the programming content over a downlink channel to a local studio 106. The local studio 106 can insert additional programming (e.g., regional programming) and/ or advertisements as needed into the programming content. The content with the insertions is then transmitted from the local studio 106 via a satellite transmission transceiver 114 to a cable service provider 108. In an embodiment, the television program may be downloaded to a receiving station, such as a head-end (H/E) of the cable service provider 108, rather than or in addition to the local studio 106. A reverse channel from the cable service provider 108 to the local studio 106 is provided so that the local studio 106 can insert additional programming content and feed the television signal back to the cable service provider 108. The cable service provider 108 then delivers the television signal over a cable network 134 to cable subscribers.

The cable network 134 is provided by the cable service provider 108 to distribute the programming content to cable subscribers. A set top box (STB) 152, located on the premises of a cable television subscriber, receives the programming content or television signal, and delivers the television signal to the subscriber's television set 154. Alternatively or in addition, the television signal can be broadcast over a wireless medium and received by a traditional aerial antenna or by a satellite dish, and then delivered to the set top box 152. Alternatively or additionally, features and functionality of the set top box 152 may be integrated into a type of advanced television or other display device.

Moreover, embodiments of the invention can use other types of broadcast media, including but not limited to, digital cable systems, satellite, very-high-data-rate digital subscriber line (VDSL), web casts, and the like. The features provided by the television set 154 can also be provisioned, in one embodiment, by a personal computer (PC) suitably configured with an adapter to convert television signals into a digitized format, and then to deliver the television signals to the video portion of the computer for display. It is noted that the invention is not limited to any one configuration of display hardware, as embodiments of the invention will work equally well using alternative reception and display arrangements.

In accordance with an embodiment of the invention, a connection to a communication network is provided for the cable subscriber. In one embodiment, the connection can be made via a cable modem 156 over a bi-directional communication link 155 to a cable modem termination system within the cable provider's 108 equipment. The connection continues to a data communication network, such as the Internet, by way of a public switched network (PSTN) 132. The PSTN network 132 is provided herein as an example, and it is understood that other types of networks may be used for connectivity to the Internet. A cable modem arrangement can be used because of its high bandwidth capability. In situations where some cable companies are not equipped to provide cable modem service to their customers, various other arrangements can be made. For example, a conventional modem connection can be used to access the Internet over a telephone line. As another example, Internet access can be gained over a DSL connection or an integrated services digital network (ISDN) connection using a telephone line. Wireless systems are also available for providing Internet access. In one embodiment, downstream data transmission can occur via cable or satellite, and upstream data transmission can occur via a telephone line.

It is noted that the Internet is chosen as an example of a data communication network because it is a well-established network, and connectivity to the Internet is easily made. However, it is noted that a global communication network, such as the Internet, is not required to practice other embodiments of the invention. A locally provided and maintained communication network may be used in an embodiment.

Continuing with FIG. 1, the set top box 152 can include a transceiver 157, such as an infrared (IR) or radio frequency (RF) transceiver, that can exchange signals with a remote control unit 158 or other user input device. The set top box 152 can be a component that is separate from the television set 154 as shown in FIG. 1, or its features can be built into circuitry of the television set 154 (e.g., an interactive television set). The set top box 152 enables a viewer to select a television program to view and then delivers the television program to the television set 154. A storage unit 162 can also be coupled to or be a part of the set top box 152. The storage unit 162 can comprise a machine-readable storage medium such as a cache, buffer, memory, diskette, compact disk, tape, or the like and their associated hardware, in one embodiment. In another embodiment the storage unit 162 can include a video cassette recorder (VCR). In another embodiment, the storage unit can include a hard disk such as a digital or personal video recorder (DVR or PVR).

As noted above, the local studio 106 can insert additional programming into the received transmission, for example, to provide cable content that includes locally provided channels. The programming is then distributed to customers over the cable network 134. In addition to local program insertion, the local studio 106 can insert advertising content. Product supplemental information relating to the advertising for participating merchants 122 can also be inserted. Product supplemental information can include information relating to the goods or services being advertised in the commercial. In addition to goods and services, coupons and other information services can be made available to the viewer, which in one embodiment can be obtained via the merchant's 122 web site 124 on the Internet. Triggers, such as Advanced Television Enhancement Forum (ATVEF) triggers, which are related to the web site 124 and/or to its contents, can be continuously updated as the television broadcast is being received.

In accordance with an embodiment of the invention, a participating merchant list 153 may be maintained. As the name implies, this list permits participating merchants 122 to provide their product supplemental information to the viewer. The participating merchant list 153 may be provided to and stored in the set top box 152. Alternately or additionally, the participating merchant list 153 may be stored at a head-end or other system of the cable service provider 108, or at a third party system. In this embodiment, the participating merchant list 153 may operate as a "white" list that allows transmission of triggers from authorized merchants and filters out other triggers. In another embodiment, a "blocked" or "black" list may be maintained at the set top box 152 or elsewhere. Such a blocked list filters out undesirable triggers and may be created and/or maintained by the cable service provider 108. Alternately or additionally, such a blocked list may be edited by an end user.

Various techniques for carrying the product supplemental information can be used. For example, triggering, announcement, or resource information can be included and sent using the ATVEF standard, in a manner known by those skilled in the art. For instance, a uniform resource locator (URL) address can be embedded in the broadcast stream. Other standards that may be used include triggering mechanisms from Wink and WorldGate. Another technique is to embed code or a script in the stream that runs on the client (e.g., at the set top box 152) to provide the information and/or purchase experience.

As noted above, the triggers, resources, or announcements can be inserted by the originating broadcaster 104, a local broadcaster 106, or by the cable system operator 108. FIG. 2 shows another example of an interactive video casting system 200 and illustrates another point of insertion of the product supplemental information. Here, a merchant 222, operating a web site 224, is located such that commercial insertion is made prior to the uplink transmission to the satellite 102.

As noted above, Internet access is not necessary to practice the invention. A locally provided network may be within the scope of the invention as claimed. The cable provider 108 can supply the foregoing features, for example, by providing a web site or "walled garden" that is accessed by its subscribers. In such a case, the cable provider 108 serves as an intermediary and submits the purchases to the actual merchants 122 or 222.

Figure 2:
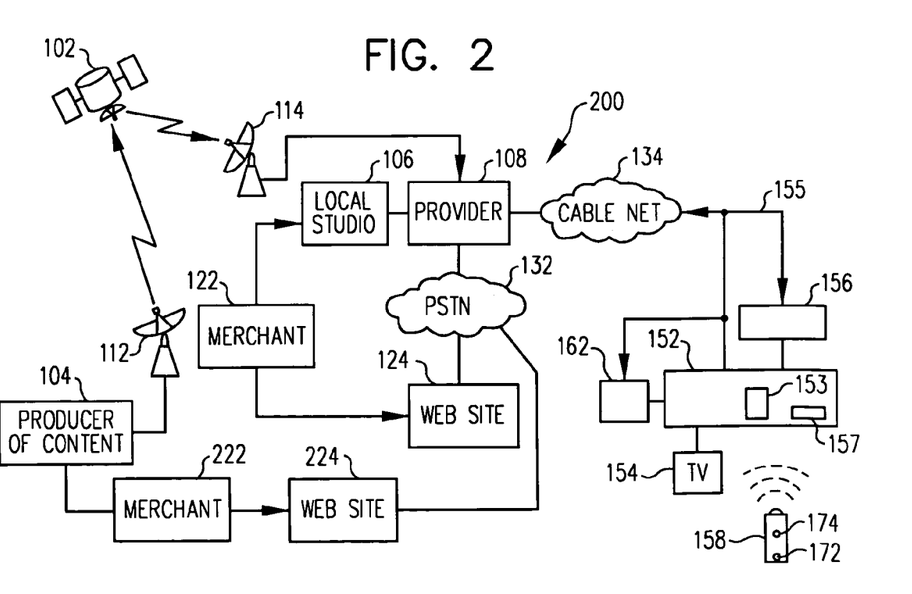
Figure 3:
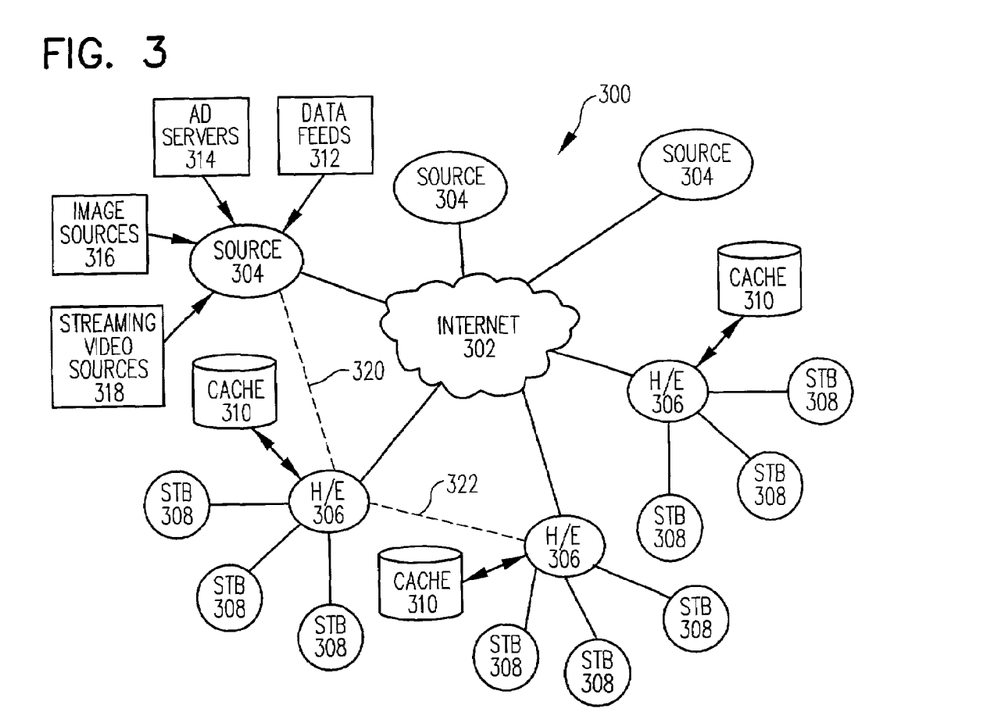

FIG. 3 shows another example of an interactive video casting system 300 for distributing Internet content in addition to television content. The system 300 can be similar to or combined with the systems 100 and 200 shown in FIGS. 1 and 2, respectively. In accordance with an embodiment of the present invention, the system 300 can be integrated with a cable television distribution system. The system 300 includes an Internet 302, a plurality of content sources 304, a plurality of distribution centers (depicted as the head-ends or H/Es 306), and a plurality of client terminals 308 (depicted as set top boxes). In addition, a content source 304 is depicted as receiving data from data feeds 312, advertisement servers 314, image sources 316, and streaming video sources 318.

The plurality of content sources 304 is coupled to the Internet 302. For example, a content source 304 may comprise a web site portal such as Go2Net.com, or a news web site such as CNN.com, or other types of sources. Each content source 304 may have various data feeds 312, servers 314, and sources 316/318 coupled to it.

For example, news or stock quote feeds 312 may be fed into the content source 304. Servers 314 may provide advertisements for insertion into multimedia content delivered by the content source 304. Sources 316/318 may provide images 316, streaming video 318, and other content to the content source 304. Various other feeds, servers and sources may also be coupled to the content source 304 of FIG. 3, or coupled to the production company 104, cable network 134, web sites 124 and 224, or to other components of the systems shown in FIGS. 1 and 2.

The Internet 302 comprises a network of networks and is well known in the art. Communications over the Internet 302 can be accomplished using standard protocols such as transmission control protocol/internet protocol (TCP/IP), hypertext transfer protocol (HTTP), file transfer protocol (FTP), or other protocols. The Internet 302 is coupled to the plurality of distribution centers 306, and each distribution center 306 is in turn coupled to a plurality of client terminals 308, which may comprise a set top box, a PC, an interactive television set, or another type of communication device or display device.

In alternative or in addition to the Internet 302 being used to distribute multimedia content from the content sources 304 to distribution centers 306, communications channels or networks 320 apart from the Internet 302 may couple one or more content sources 304 to one or more distribution centers 306. One example of such an alternate path for communications is illustrated by a first dashed line 320 in FIG. 3. Alternately or additionally, peering connections may exist between distribution centers 306. One example of such peering is illustrated by a second dashed line 322 in FIG. 3. Other configurations are also possible and are included within the scope of the present invention.

Caches 310 may be provided at (or coupled to) the distribution centers 306. Such caches 310 may be used to increase the performance in the delivery of multimedia content to the client terminals 308. For example, larger files for video and other high bandwidth content may be stored in such caches 310, which may be closer to the client terminals 308 than to the content sources 304. In addition, reliability and guaranteed bandwidth may be provided because the Internet 302 is not in-between such caches 310 and the client terminals 308.

In accordance with one embodiment of the invention, different or multiple portals may be used to access the information provided through the interactive video casting systems of FIGS. 1-3, based on the type of client terminal being used by the end user. That is, for example, a television portal may be provided for an end user that uses the television set 154 to access the information. A PC portal may be provided for an end user that uses a PC to access the information. Portals can be provided for end users that use cellular telephones, PDAs, audio devices, and the like to access the interactive video casting systems of FIGS. 1-3.

Such portals may be provided in several possible ways. In one embodiment, the client terminal (e.g., the end user's display device or audio device) can be suitably configured with an adapter that includes hardware and software. The adapter converts the television signals, the Internet or web page content, or other information provided from the interactive video casting system into a digitized format or other format that is compatible with the operational features of the client terminal.

In another embodiment, the cable provider 108 can deliver signals having different formats to the various client terminals, with the client terminals not necessarily having special adapters. Therefore, as an example, the cable provider 108 or other party can generate/deliver information (e.g., television programming, web page content, and the like) having a format that is compatible for end users that receive the information via the television set 154. The cable provider 108 or other party can also generate/deliver the same information (e.g., simultaneously with the television portal on the same communication link, separately on a different communication link, on-demand independent of the television portal, and the like) using a format that is compatible with end users that receive the information via PCs, PDAs, cellular telephones, and the like. Thus, the term "interactive video casting system" is used to describe generally a system that can deliver video information over any network and any network-compatible device by broadcasting, multicasting, or unicasting. An "interactive television system" is one type of or one means of access to an "interactive video casting system."

In one embodiment of the interactive coupon channel, the interactive coupon channel comprises content and other information that can be configured/arranged similar to a web site. Thus, tuning to the interactive coupon channel can be performed by having the set top box 152 access an IP address, URL address, or other address where the interactive coupon channel content can be viewed. In such an embodiment, the interactive coupon channel can be thought of as a "synthetic channel" since it can be tuned to as if tuning to a conventional television channel, yet its contents (e.g., coupons and related user features) are unlike conventional television channels.

In another embodiment, the interactive coupon channel can be similar to a broadcast television channel in that it may present video advertisements, commercials, or other coupon programming, accompanied by features that allow users to search, select, redeem, send or save coupons. In yet another embodiment, the interactive coupon channel can comprise a television channel that provides a scrolling ticker or list of merchants and/or coupons that viewers can select. Once a coupon is selected, the viewer's set to box 152 can be directed to a web site, another channel or sub-channel, screen, and the like when the viewer can perform transactions related to the selected coupon.

Figure 4:
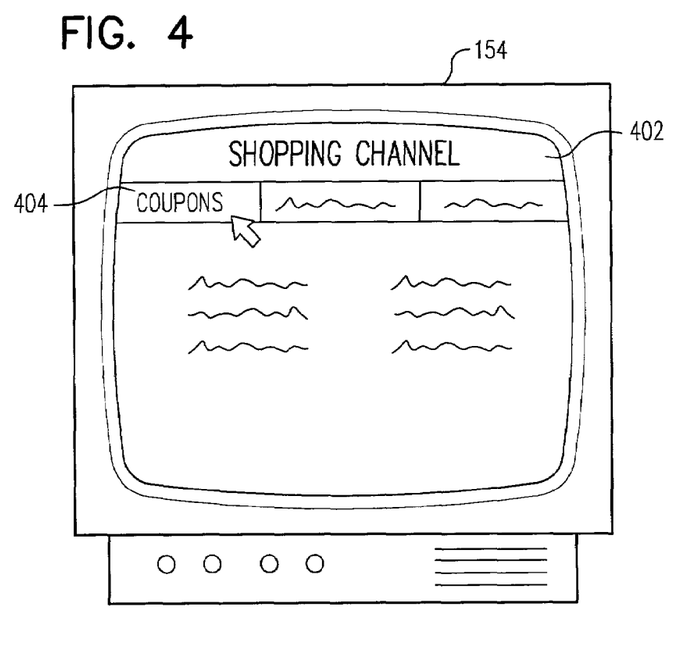
FIGS. 4-16 illustrate example uses of an embodiment of an interactive coupon channel conducted via the video casting systems of FIGS. 1-3.

FIGS. 4-16 illustrate example uses of an embodiment of an interactive coupon channel conducted via the video casting systems of FIGS. 1-3. The interactive coupon channel can be accessed in a variety of ways. For example, the user can tune the television set 154 directly to the interactive coupon channel or the user can access the interactive coupon channel through another channel. FIG. 4 illustrates an example of the latter concept, showing the television set 154 tuned to a shopping channel 402 provided through the cable service provider 108, and in the left-hand corner of the screen, a coupons prompt 404. If the coupons prompt 404 is activated through the user's remote control unit 158 or other user input device, an interactive coupon channel 502 is displayed on the television set 154, as shown in FIG. 5.

Figure 5:
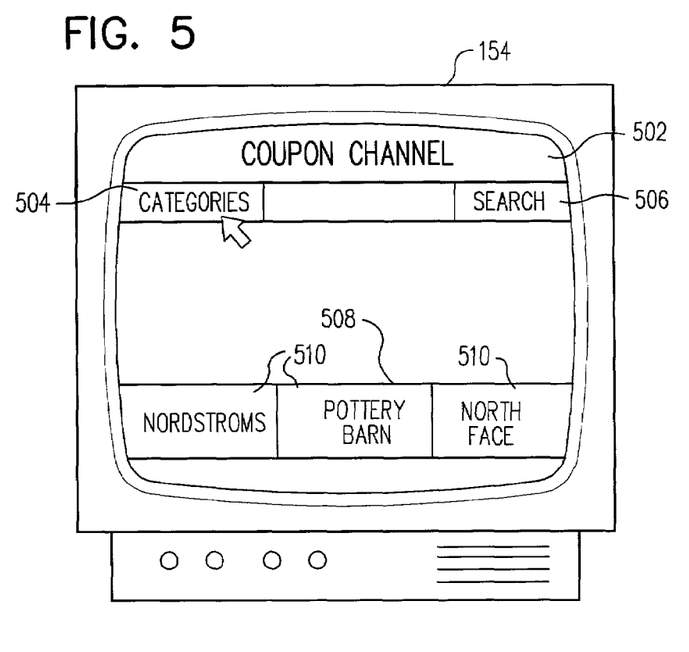
Figure 6:
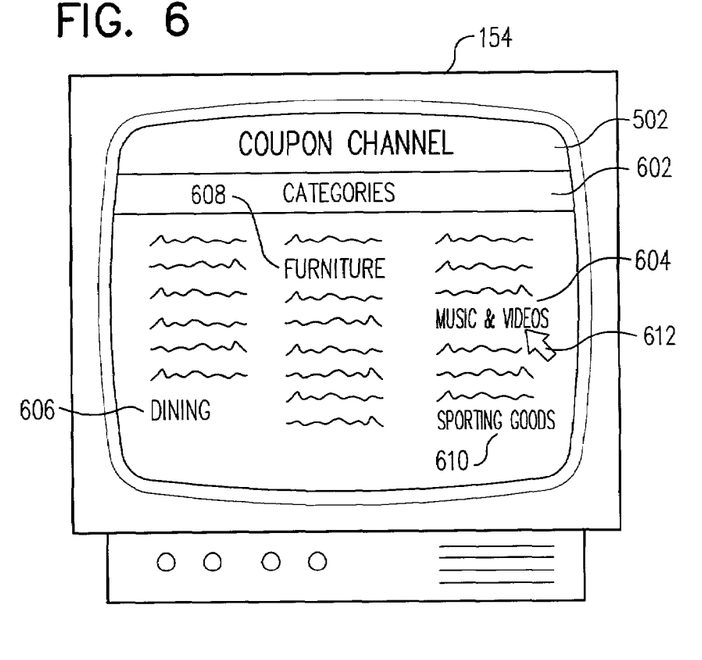

In FIG. 5, the interactive coupon channel 502 displays numerous options for the user, among them, a categories prompt 504, a search prompt 506, and a revolving advertisements banner 508 comprised of individual banner ads 510. FIG. 6 illustrates that a categories page 602 is displayed for the user upon activation of the categories prompt 504. The categories page 602 contains a plurality of merchant and service categories from which the user can select a coupon. Categories include, but are not limited to, for the examples shown in FIG. 6: Music and Videos 604, Dining 606, Furniture 608, Sporting Goods 610. In this example, the user is looking for a coupon for a music CD and after browsing the categories, selects the Music and Videos category at 612.

Figure 7:
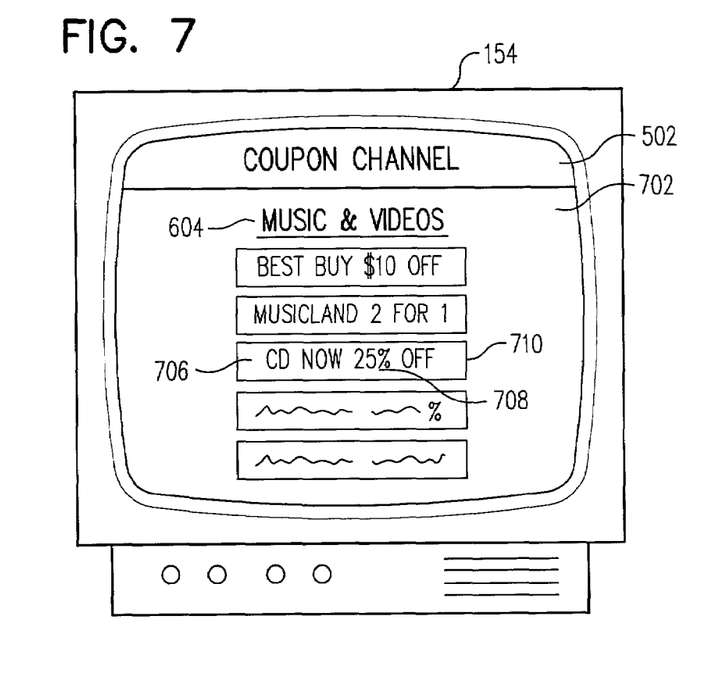

FIG. 7 illustrates a subsequent step occurring after the user selects a category from the categories page 602. The interactive coupon channel 502 then displays a screen 702 containing banner ads for stores offering coupons in the Music and Videos category 604 on the interactive coupon channel 502. The banner ads can serve as a preview to an electronic coupon while containing a hypertext link, which if clicked, can connect the user's set top box 152 to an area of the interactive coupon channel 502 containing the electronic coupon. Typically in various embodiments, the text of the banner ads includes a name of a merchant and a discount offered. For example in FIG. 7, a banner ad 710 shows a name of a merchant, CD Now, at 706, and a percentage discount offered by the coupon, 25%, at 708.

The user is not limited to finding a coupon by browsing or searching categories. Returning to FIG. 5, the interactive coupon channel 502 offers the search prompt 506 and the revolving advertisements banner 508. In an embodiment, the search prompt 506 allows a user to enter a keyword to find a coupon. An example of a keyword might be a store name, product name, or any other word associated with a product, service or merchant. Once the search is conducted, the results can be displayed showing a listing of banner ads with the name of the merchant and the corresponding discount.

Figure 8:
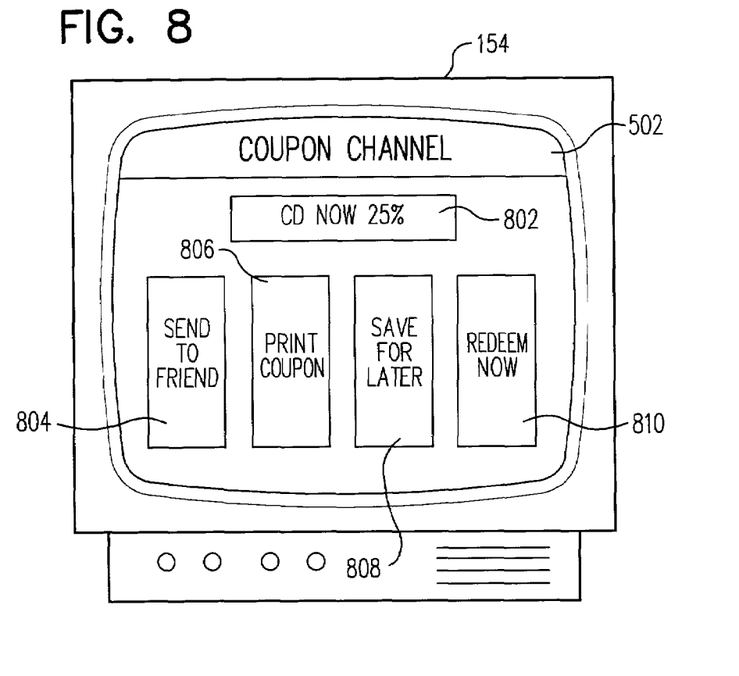

The revolving advertisements banner 508 is another a shortcut to finding a coupon and is comprised of individual banner ads 510 for various merchants. FIG. 5 illustrates examples of individual merchants, such as, Nordstrom, Pottery Barn and the North Face. Once the user clicks on any banner ad, whether the ad was obtained from a category search, keyword search, or displayed directly from the revolving advertisements banner 508, the user is presented with one or more electronic coupon(s) for a particular merchant, as shown in FIG. 8 at 802. Various options are presented with each coupon: the interactive coupon channel 502 can send a coupon to a friend 804, print a coupon 806, save a coupon for use at a later time 808, or redeem a coupon 810.

If the user chooses to send a coupon to a friend 804, the interactive coupon channel 502 can prompt the user for an e-mail address to which the coupon will be sent, along with any additional message desired by the user. Another option is to print the coupon 806, using a set top box printer or other printer. This enables the user to redeem the coupon at a merchant's physical location, which is especially useful for coupons for services (e.g., dining or drycleaning). If the user chooses to save the coupon for use at a later time 808, the coupon can be saved to a storage location identified as "My Coupons," which in one embodiment can be a sub-folder or sub-channel of the interactive coupon channel 502. The "My Coupons" area of the interactive coupon channel 502 can serve as the user's personal coupon center and can be accessed when a command to save a coupon is received, such as when the user clicks at 808. "My Coupons" can also be accessed as shown in FIG. 9.

Figure 9:
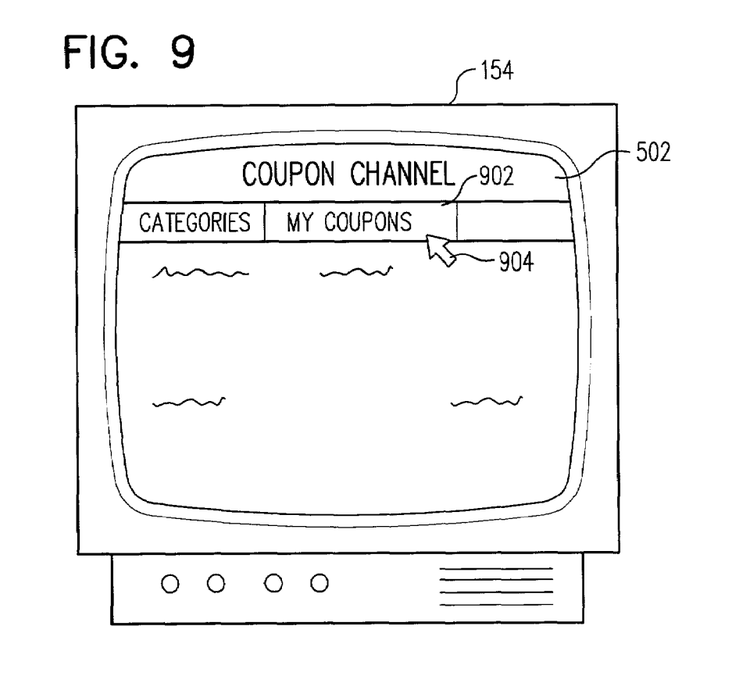

FIG. 9 shows the interactive coupon channel 502 on the television set 154, displaying a "My Coupons" option 902. Information in the "My Coupons" area of the interactive coupon channel 502, as well as other coupon information (such as software or data related to operation of the interactive coupon channel's 502 functions, and so on) can be stored in a storage unit. The storage unit to store the coupon information can be located in the set top box 152 or other local storage area, in a server remote from the set top box 152, in the cache(s) 310, in any combination of these components and/or in other suitably located storage areas in the interactive television systems shown in FIGS. 1-3.

In an embodiment, after selecting to save a coupon 808, the user can be presented with an option within "My Coupons" to have the coupon saved to a category that the channel has the coupon grouped, or the user can create the user's own grouping. For example, all of the coupons needed by the user for a particular shopping trip might be saved to a group named by the user, such as "Weekend Shopping Coupons." After the user indicates an appropriate category, the coupon can be saved under that category in the "My Coupons" area of the interactive coupon channel 502.

Figure 10:
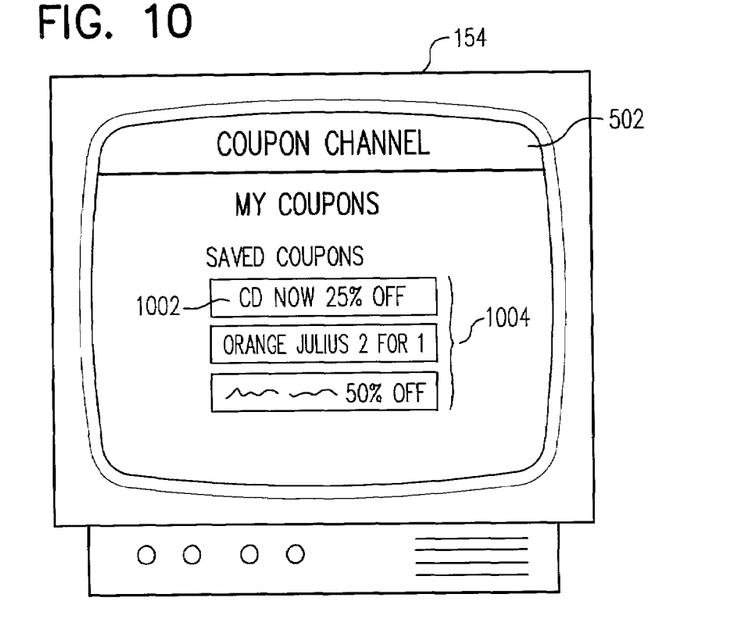

FIG. 10 illustrates an example of the retrieval of saved coupons. Once a user selects the "My Coupons" option in FIG. 9 at 904, the user's saved coupons 1004 are displayed on the interactive coupon channel 502, as shown in FIG. 10. The CD Now coupon, saved in FIG. 8 at 808, appears at 1002 in FIG. 10. The user's saved coupons can be displayed in an uncategorized fashion as shown in FIG. 10 or the interactive coupon channel 502 can sort and display coupons by subject matter, merchant, expiration date, and the like, at the user's command. Accordingly, the default screen can be set to automatically display the coupons according to any of these groupings.

In one embodiment, a user can receive automatic reminders by e-mail of coupon expiration dates. The reminders can be displayed by default seven days before a coupon is to expire, for example, or the user can change the timing of the reminder. In addition, if the user so chooses, visual, audible, email, and screen alerts as to the expiration date of a coupon can be provided. Such alerts can be provided on any electronic device, including, but not limited to, a user's PC, handheld device, or cell phone. Such alerts can be sent by a server that correlates user information (e.g., the user's email address, set top box address, cell phone number, or other information in a database) with the coupon information.

Figure 11:
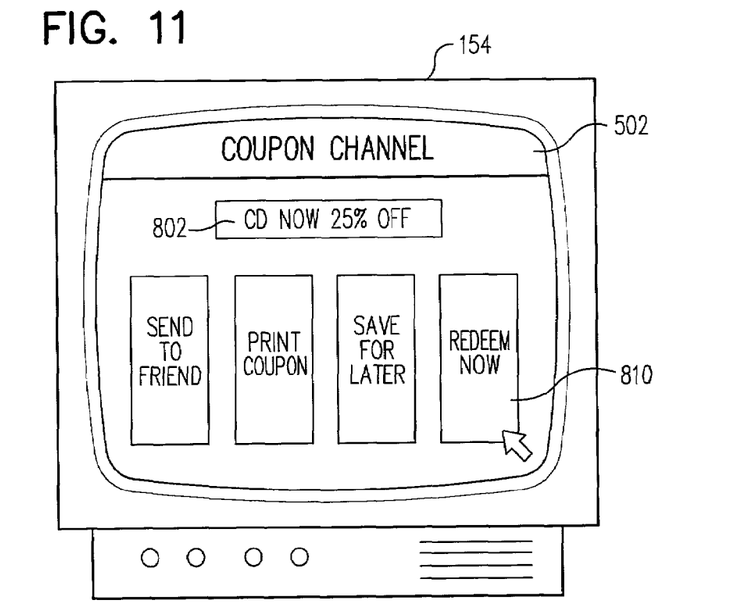
Figure 12:
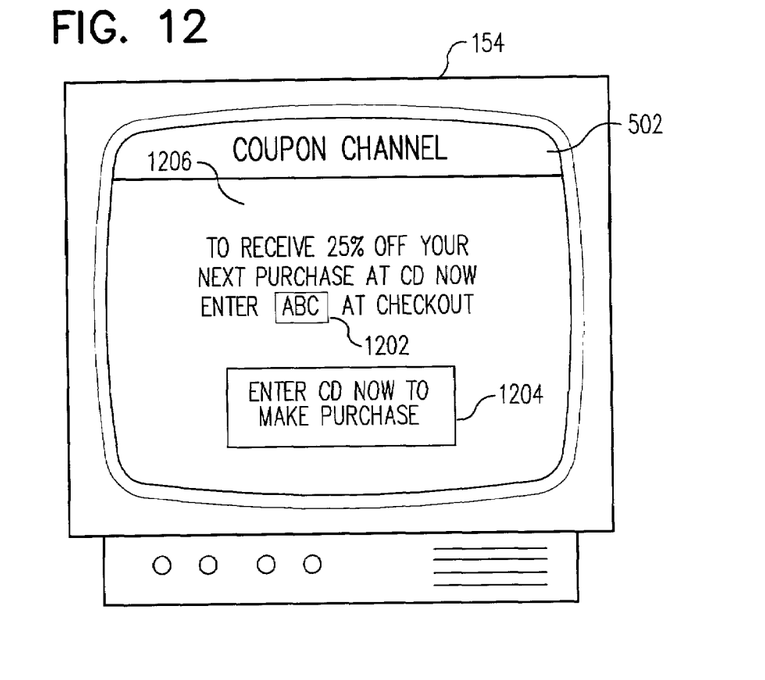
Figure 13:
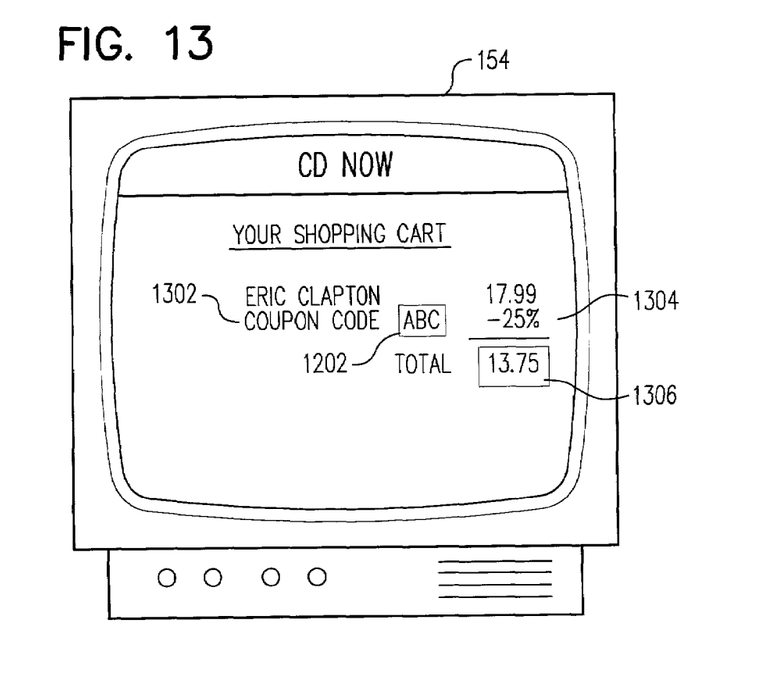

FIGS. 11-13 illustrate a sequence of events involved in redeeming an electronic coupon 802. FIG. 11 shows that to redeem a coupon, the user selects an option to redeem the coupon, in this example, "Redeem Now" at 810. FIG. 12 shows that a screen 1206 appears, providing a prompt 1204, that can include a hypertext link, capable to connect the user's television to the merchant's web site 124. Also provided on the screen 1206 is a discount code 1202 for the user to enter when ready to finalize a purchase at the merchant's web site 124. When the user "clicks" on the prompt 1204, the user's set top box 152 connects to the merchant's web site 124 and displays the contents of the web site 124 on the television set 154 so that the user can shop. FIG. 13 illustrates that when the user is ready to check out, the user enters the discount code 1202 at the prompt 1302 and the discount, 25% 1304, is applied to the price of the goods at 1306. In alternative to the use of a discount code as in FIGS. 12 and 13, the discount can also be automatically provided by the use of a stored Internet cookie so that the user does not need to enter a code at checkout.

In addition or in alternative to redeeming a coupon online, the coupon discount information can be transferred onto a smart card. A set top box smart-card reader or other device can store the coupon discount on a smart card. The user inserts a smart card into the reader, and then the set top box 152 places the coupon information on the smart card. Then, the user can take the card to the merchant's physical location for redemption.

Figure 14:
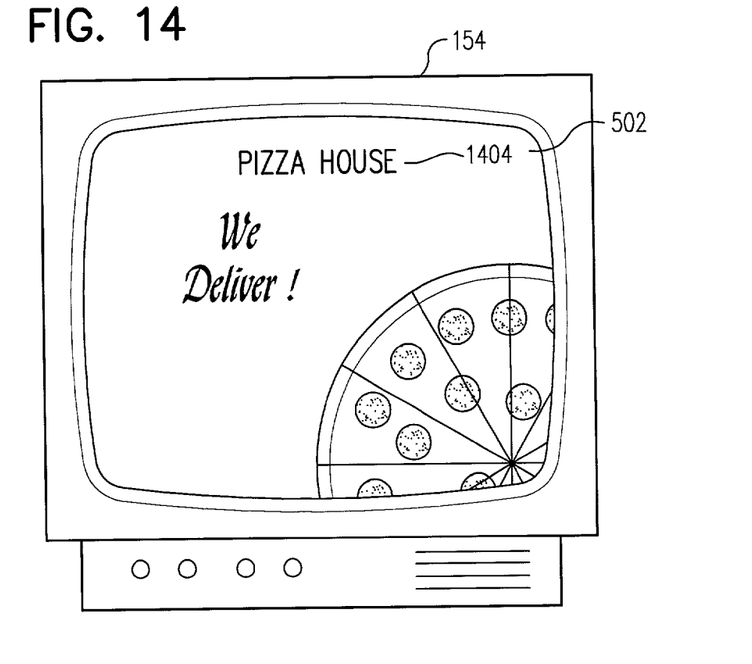
Figure 15:
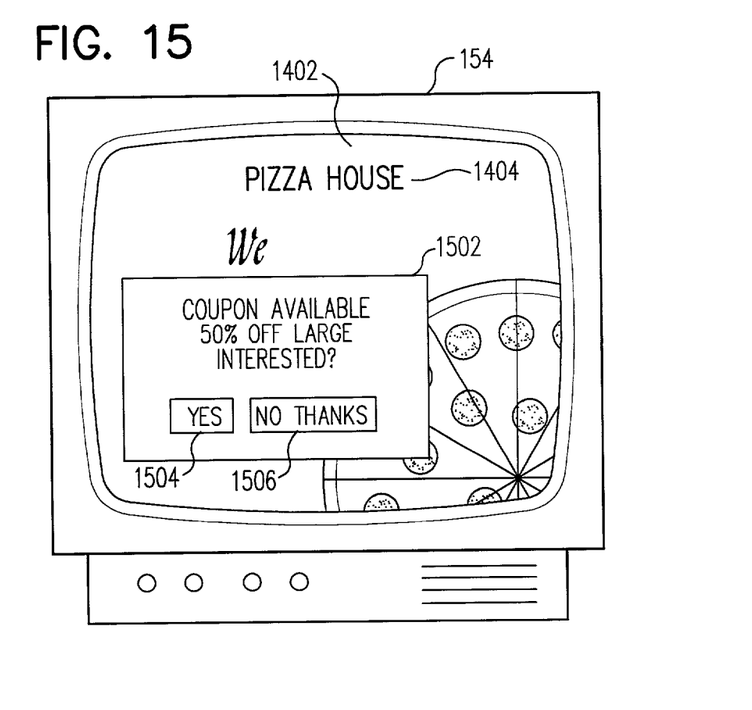
Figure 16:
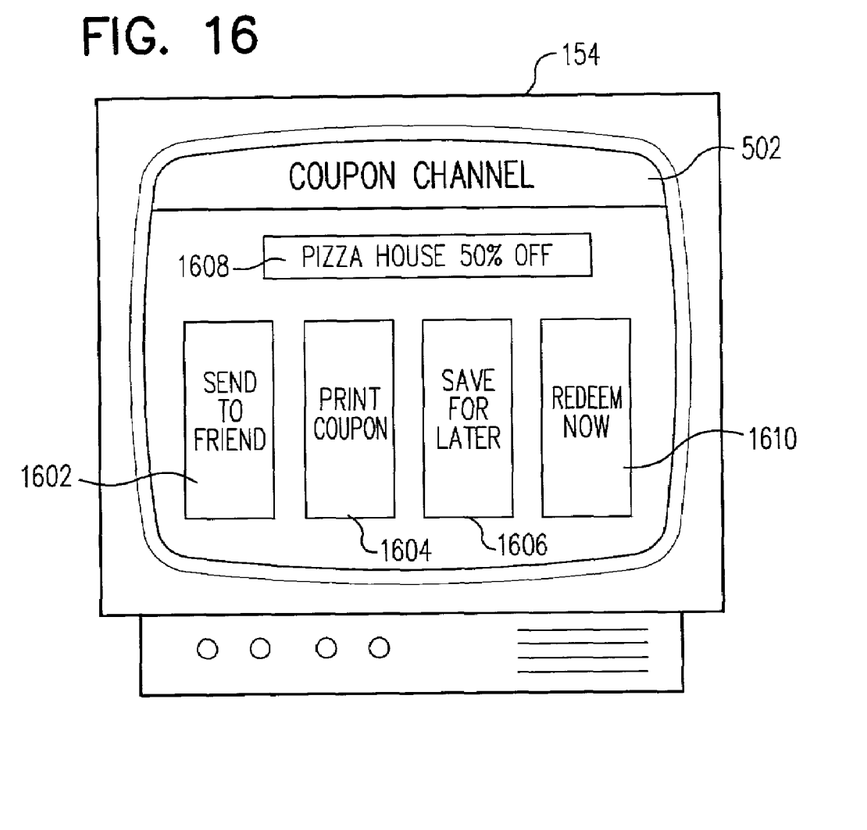

FIGS. 14-16 illustrate another mode of access to the interactive coupon channel 502. In an embodiment, coupons related to the content of a television program or commercial can be offered while a user is viewing the program or commercial. In FIG. 14, a commercial 1402 for a local pizza restaurant is displayed for the user's viewing on the television set 154. The commercial 1402 is advertising a restaurant 1404 that offers a coupon that is available on the interactive coupon channel 502. In FIG. 15, an announcement from the interactive coupon channel 502 offering the coupon is presented at 1502. In this example, the coupon channel announcement 1502 is presented as an overlay on the screen. In alternative to the overlay 1502, a small indicator or a "picture in picture" arrangement can also announce the availability of a coupon.

In accordance with one embodiment of the invention, the announcement 1502 may be correlated to or otherwise based upon the subject matter of the television commercial 1402 or program via the use of triggers, such as ATVEF triggers. In one example, triggers may be inserted into the vertical blanking interval (VBI) of the television signal of the television commercial or program. Different triggers may be inserted for different subject matter that is presented during the course of various television programming shown on the broadcast channel. Thus, triggers for grocery coupons may be inserted for cooking programs, triggers for fast food coupons for fast food commercials, and so on. Furthermore, it is possible to insert different triggers into a single television program, such that the triggers correspond to the different subject matter that may be shown during the course of the television program.

As described above, trigger insertion may occur at several possible locations of the interactive video casting systems of FIGS. 1-3. The content producer 104, the merchants 122 or 222, the local studio 106, the cable service provider 108, or other party can insert or provide triggers for inclusion with the television program or commercial 1402. Triggers or other information that are included along with the television program can cause several types of activities to occur. As shown in FIG. 15, the triggers can cause the announcement 1502 or other overlay to appear/launch to announce the availability of a coupon based on the subject matter of the television program or commercial 1402. FIG. 15 shows that the user can indicate whether the user is interested in the coupon by clicking on a "yes" prompt 1504 or a "no" prompt 1506. As mentioned above, a small indicator (activated via triggers) can also be used to present a coupon opportunity. When the "yes" prompt 1504 or an indicator is "clicked" or otherwise activated by the viewer using the remote control unit 158 (or other user-input device), a command is sent from the remote control unit 158 to the set top box 152. The set top box 152 receives the command, recognizes the command as being sent in response to the prompt 1504 or other indicator, and then tunes to the interactive coupon channel 502 as shown in FIG. 16. The set top box 152 may tune to the interactive coupon channel 502, for example, by processing other information sent along with the trigger (such as code or other instructions that instruct a tuner of the set top box 152 to tune to the channel frequency of the interactive coupon channel 502 if the command is received from the remote control unit 158).

Once the set top box 152 tunes to the interactive coupon channel 502, the options from the interactive coupon channel 502 are presented, as shown in FIG. 16. The electronic coupon is shown at 1608 and the user can choose to send the coupon to a friend 1602, print the coupon 1604, save the coupon for later 1606, or redeem the coupon 1610.

Not only can coupon information be correlated with television material being viewed, but information about a user's coupon preferences can be gathered by the interactive coupon channel 502 and used in a decision to announce the availability of a coupon. Thus, the content presented to the viewer on the interactive coupon channel 502 can be automatically customized to the viewer, alternatively or in addition to being correlated with the subject matter of the television program or commercial. For instance, regionalized and local coupons can be automatically provided to the user without the user having to explicitly enter a zip code or other address information.

Figure 17:
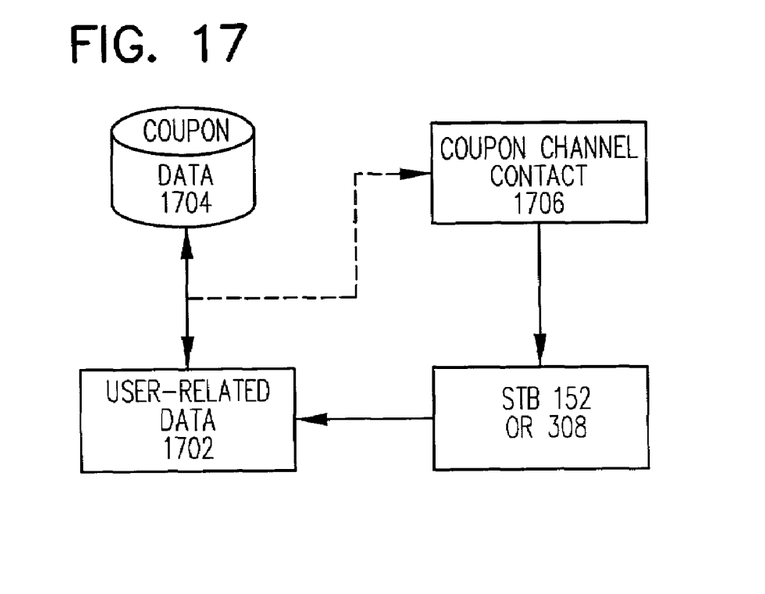
FIG. 17 is a functional block diagram of an embodiment of a correlation technique that can be used to provide customization for the coupons offered on the interactive coupon channel.

FIG. 17 is a functional block diagram of an embodiment of a correlation technique or a correlation unit that can be used to provide customized content for information related to coupons on the interactive coupon channel 502. One or more components of this block diagram may be embodied in or performed by software or other machine-readable instruction stored on a machine-readable medium. The machine-readable medium may be located in the set top box 152 or other local storage unit, at the head-end 306, at a server including the cache 310, or at some other suitable storage location of the interactive video casting system or combination thereof.

When the set top box 152 tunes to the interactive coupon channel 502, user-related data 1702 is automatically obtained. In an embodiment, the user-related data 1702 includes an identifier of the set top box 152 (or 308) that identifies the set top box 152 by its owner's name, address, network/geographic location of the set top box 152 in the interactive video casting system, or other identification information. The identifier can comprise an alphanumeric string that is hard-coded into the set top box 152 in one embodiment. This identifier may be automatically obtained using several possible techniques, including but not limited to, polling the set top box 152, transmission of the identifier by the set top box 152 to the head-end 306 when tuning to each television channel, detecting the particular set top box's 152 tuning to a channel and locating that set top box's 152 identifier in a database via a look-up process, or other method.

Once the identifier is obtained and used to determine the set top box's 152 address or geographical location, a correlation is performed with coupon data 1704. The coupon data 1704 can be stored in a database in one embodiment, such as in the cache 310, at a server, or at a local storage location (e.g., at the set top box 152). The coupon data 1704 can include, but is not limited to, product category, merchant name, merchant location, coupons currently available, coupons for items related to television programs or commercials currently being shown, and the like. Thus, the correlation between the user-related data 1702 and the coupon data 1704 can be specifically performed to find entries in the coupon data 1704 database that match the geographic location of the user. Once this correlation is performed, another correlation can be performed to further narrow the entries by keeping only entries that are related to the instantaneous subject matter of the television program or commercial that is currently being shown on the television 154. Ultimately, the correlation results in transmission or presentation of customized coupon channel content 1706 to the set top box 152.

Figure 18:
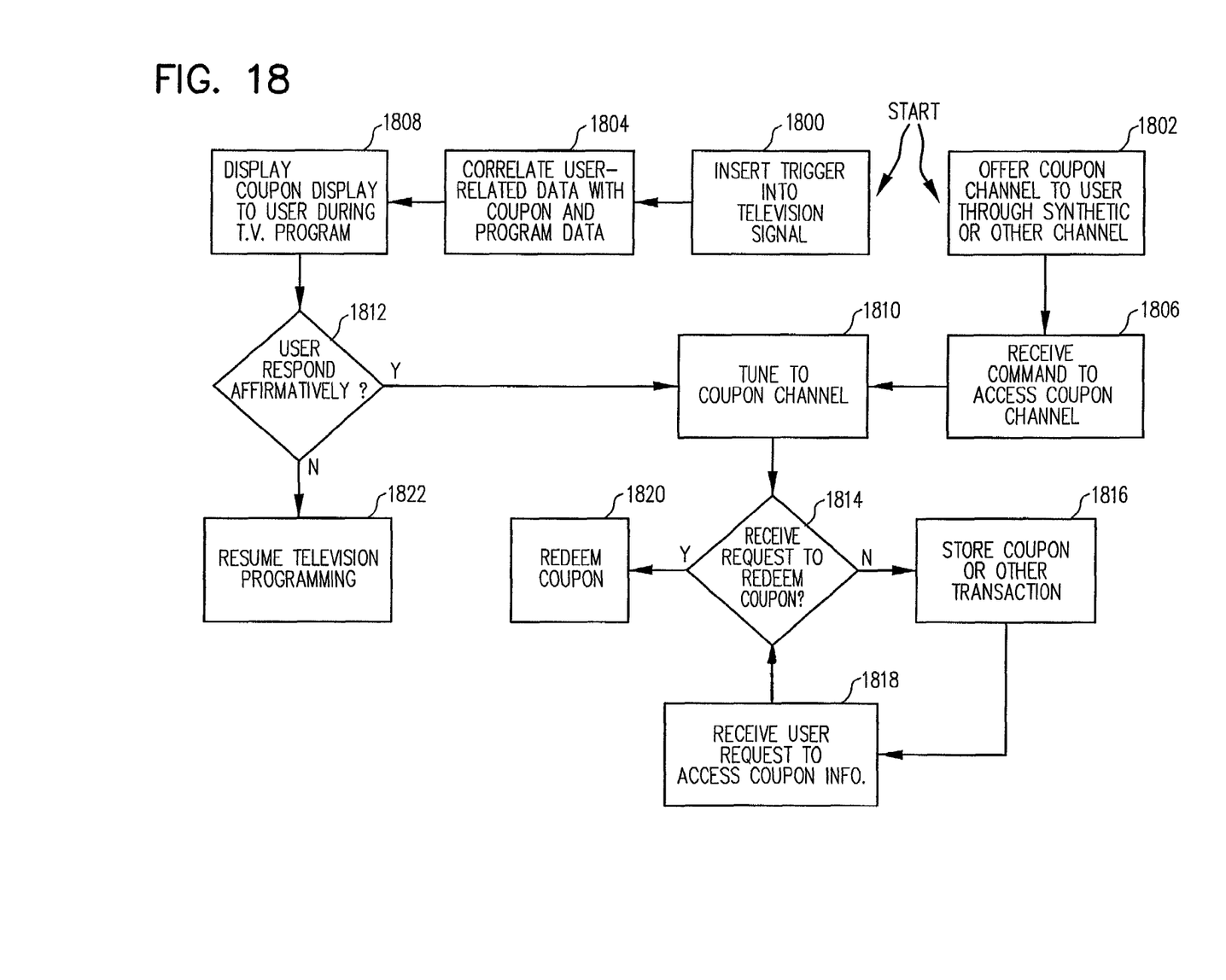
FIG. 18 is a flow diagram illustrating a sequence of events involved in a transaction conducted via the interactive coupon channel according to an embodiment of the invention.

FIG. 18 is a flow diagram of an embodiment of the invention. Elements of the flow diagram can be embodied in software or other machine-readable instructions stored on a machine-readable medium, which can be suitably located in the set top box 152 or other local storage location, or located in the systems of FIGS. 1-3 (such as at a server in a head-end). Blocks 1800 and 1802 illustrate two possible starting points for a transaction related to the interactive coupon channel 502. At a block 1802, the interactive coupon channel 502 is offered to a user through a synthetic or other channel. Examples similar to this block were discussed previously where a user accesses the interactive coupon channel 502 via a link available on the shopping channel 402. Thus, a user browsing for goods on the shopping channel 402 can access the interactive coupon channel 502 to search for coupons for goods at the time the user contemplates purchasing the goods. Once a preference or command to access the interactive coupon channel 502 is received at a block 1806, the user's set top box 152 tunes the user's television set 154 to the interactive coupon channel 502 at a block 1810. The set top box 152 can receive a command to access the interactive coupon channel 502 at a block 1806 in response to a prompt or other indicator or from the remote control unit 158. Blocks 1806 and 1810 can also represent a response to a user who directly accesses the interactive coupon channel 502 by tuning the set top box 152 to the interactive coupon channel 502 without first accessing another channel.

In the alternative or in addition to the above-described sequence, coupons can be announced to users while the users view television programming. Beginning at a block 1800, information in the form of a trigger is inserted into the television signal at various points in the interactive casting systems of FIGS. 1-3. A trigger may be inserted into the vertical blanking interval of the television commercial or program and can indicate the availability of coupons related to the subject matter of the program or commercial being shown. Triggers can be inserted to indicate that coupons are available for the goods being advertised in a particular commercial or for the various subject matter that may be shown during the course of a program. At a block 1804, user-related data can be correlated with the coupon and program data (in the trigger) in order to customize the coupons being offered. User-related data includes information about the user, such as a user's geographic location or coupon preferences. This block ensures that a user is not offered a coupon for a merchant out of the user's geographic area, for instance. At a block 1808, the user is offered a coupon option in the form of an overlay, picture-in-picture arrangement, an icon or any other audiovisual indicator. The trigger, sent with the television signal at the previous block 1800, can be used to present this option. Next, a block 1812 indicates that a negative or affirmative response to the coupon announcement is to be received. This command can be received from a response sent from the remote control unit 158 or by a response initiated from the "clicking" of an appropriate icon or indicator. If the user responds negatively, as the next block 1822 indicates, television programming resumes as normal. The overlay, icon or other audiovisual indicator disappears to permit regular viewing of the television programming. If, however, the user responds affirmatively, a block 1810 indicates that the set top box 152 tunes to the interactive coupon channel 502.

Once the television is tuned to the interactive coupon channel 502, the user is presented with various options regarding coupons. If the user reached the interactive coupon channel 502 because a trigger announced the availability of a coupon, the user can have the immediate option of having a transaction performed related to that coupon. Other options available once the interactive coupon channel 502 is accessed, include searching, printing, e-mailing or saving coupons.

If a request is received from the user to redeem a coupon at a block 1814, a block 1820 indicates that the coupon can be redeemed online. The block 1820 represents a series of transactions performed in order to complete an online redemption. This may include connecting to the merchant web site 124 and supplying the user with a discount code for use at check-out. If a request to redeem a coupon is not received at a block 1814, the coupon can be stored or another transaction can be performed at a block 1816. Transactions that can be performed are varied and can include the printing of a coupon or storing of coupon information on a smart card for point-of-sale redemption. Other transactions available were discussed previously and include sending of the coupon by e-mail and/or arranging to have reminders of a coupon expiration date sent to a user. At a block 1818 a transaction can be resumed or coupon information accessed. The user can access coupon information from the My Coupons area of the interactive coupon channel 502 and sort coupons by expiration date or subject matter. The user may want to print out a coupon or store information on a smart card. If a request is received to redeem a coupon, the user can be returned to block 1814 and then move onto the block 1820 to complete the transaction.

In conclusion, an embodiment of the invention provides the interactive coupon channel 502 for interactive television. The interactive coupon channel 502 serves as a channel which can perform many tasks related to coupons, which otherwise would have to be done manually and inefficiently. These functions include finding, organizing and retrieving coupons. The interactive coupon channel 502 can be accessed by tuning directly to the channel or through a link from another channel. The interactive coupon channel 502 can also be presented to the user in the form of an announcement which appears while the user is watching television.

An ATVEF trigger can be inserted into the vertical blanking interval of the television signal of the television commercial or program. Trigger insertion can occur so that the user is presented with coupons related to the subject matter of the commercial or program the user is viewing. The announcements can be correlated to user-related data so that the coupons announced are user-specific (for example, only the coupons in the user's local geographic area are announced).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
providing a television program on a first channel of an interactive video casting system;
including information with the television program on the first channel to link the first channel to a second channel based on subject matter shown in the television program;
filtering the information to exclude coupons from merchants not listed on a participating merchant list;
providing a notification to a user of an expiration date of a coupon separate from the expiration date printed on the coupon; and
responsive to a command received from a user input device, using the information to link the first channel to the second channel, and subsequently providing content on the second channel to allow a user to initiate a transaction related to a coupon on the second channel, wherein the second channel is viewable and navigable by the user; and
automatically generating a reminder of an upcoming coupon expiration date.

2. The method of claim 1 wherein the interactive video casting system comprises an interactive television system and wherein the information included with the television program on the first channel includes triggers that announce availability of the coupon on the second channel.

3. The method of claim 1 wherein linking the first channel to the second channel includes one of generating an overlay to present the content on the second channel over at least a portion of the television program, generating a picture-in-picture arrangement to concurrently present the content on the second channel with the television program on the first channel, or tuning from the first channel to the second channel to replace presentation of the television program with presentation of the content.

4. The method of claim 1 wherein the linking of the first channel to the second channel is capable of being performed based upon user-related data and wherein the user-related data can be automatically obtained by receiving an identifier of a client terminal of the user.

5. The method of claim 1, further comprising obtaining from the user a preference for a date to be notified of the expiration date of the coupon.

6. The method of claim 1 wherein the notification is capable of being presented on a channel different from the second channel.

7. The method of claim 1 wherein the transaction related to the coupon includes searching for one or more coupons based on one or more of a user-selected merchant category, a user-selected service category, or a user-provided keyword.

8. The method of claim 1 wherein the transaction related to the coupon includes storing one or more coupons in a storage area.

9. The method of claim 1 wherein the transaction related to the coupon includes sorting a group of coupons based on at least one of subject or merchant.

10. The method of claim 1 wherein the transaction related to the coupon includes printing the coupon from a printing device and transferring information related to the coupon to a smart card.

11. The method of claim 1 wherein the transaction related to the coupon includes redeeming the coupon.

12. The method of claim 11 wherein redeeming the coupon includes redeeming the coupon on a merchant web site.

13. An article of manufacture, comprising:
a machine-readable medium having stored thereon instructions to:
filter coupons available on a second channel to exclude coupons from merchants not listed on a participating merchant list;
correlate information, related to a television program on a first channel of an interactive video casting system, with data related to the filtered coupons available on the second channel;
based on a correlation result, present information related to a coupon to a client terminal; and
respond to a request received from the user in response to the information presented and allow the user to view the second channel and redeem the coupon on a channel different from the second channel.

14. The article of manufacture of claim 13 wherein the instructions to correlate information includes instructions to correlate the information with information related to a user.

15. The article of manufacture of claim 14 wherein the instructions to correlate information related to the user include instructions to automatically obtain data related to the user by processing a received identifier of the client terminal.

16. The article of manufacture of claim 13 wherein the machine-readable medium further includes instructions stored thereon to integrate elements of a coupon channel into a television commercial sent from the interactive video casting system to the client terminal.

17. The article of manufacture of claim 13 wherein the machine-readable medium further includes instructions stored thereon to allow the user to receive automatically generated reminders of a coupon expiration date.

18. The article of manufacture of claim 13 wherein the machine-readable medium further includes instructions stored thereon to allow the user to transfer coupon information to a smart card.

19. The article of manufacture of claim 13 wherein the machine-readable medium further includes instructions stored thereon to integrate elements of a coupon channel into a television program sent from the interactive video casting system to the client terminal.

20. The article of manufacture of claim 13 wherein the machine-readable medium further includes instructions stored thereon to allow the user to send a coupon to an e-mail address.

21. A method, comprising:
correlating information related to a television program presented on a first channel with information related to a coupon on a second channel, the information relating to the coupon on the second channel including information related to a user;
displaying the coupon to the user on the second channel if a) the information related to the coupon is consistent with information on the first channel and b) the coupon is offered by a merchant listed on a participating merchant list; and
responding to a command received from a user input device to allow the user to participate in a transaction related to the coupon displayed on the second channel.

22. The method of claim 21 wherein the information on the second channel related to the coupon includes merchant information.

23. The method of claim 21 wherein the information related to the user is obtained by obtaining a set top box identifier.

24. The method of claim 21 wherein the transaction related to a coupon includes printing the coupon on a printing device.

25. A method, comprising:
offering a coupon available from a coupon channel of an interactive video casting system, the coupon channel comprising one of a plurality of different user-viewable channels available on the interactive video casting system, wherein offering the coupon comprises excluding coupons from merchants not listed on a participating merchant list and presentation on another of the plurality of different channels of information indicative of availability of the coupon via a display screen of a client terminal in communication with the interactive video casting system, the interactive video casting system comprising a plurality of sources from which to provide coupons for the coupon channel, the offered coupon being affiliated with at least one merchant that is subscribed to the interactive video casting system and listed on the participating merchant list, wherein offering the coupon includes providing a plurality of features related to transactions that can be conducted in connection with any of the coupons available from the coupon channel;
responsive to a command received from a user input device that is in communication with the client terminal, conducting a transaction related to the offered coupon, the user input device having at least one button to send the command to the client terminal, the client terminal capable to correlate the received command with the offered coupon and to initiate the transaction subsequent to correlation of the received command with the offered coupon; and
providing an electronic notification related to the offered coupon from the interactive video casting system subsequent to conducting the transaction, the electronic notification capable of being provided to the client terminal for display on the display screen.

26. The method of claim 25 wherein the plurality of features related to transactions includes at least one of a feature to send one of the selected coupons to another user, a feature to print one of the selected coupons, a feature to save one of the selected coupons in the personal storage location, or a feature to redeem one of the selected coupons with one of the subscribed merchants.

27. The method of claim 25 wherein offering the coupon comprises offering the coupon on a channel different from the coupon channel.

28. The method of claim 25 wherein the notification is capable of being provided to a device different from the client terminal.

29. A method, comprising:
offering a coupon available from a coupon channel of an interactive video casting system, the coupon channel comprising one of a plurality of different user-viewable channels available on the interactive video casting system, wherein offering the coupon includes presentation, on another of the plurality of channels via a display screen of a client terminal, of information indicative of availability of the coupon via use of triggers sent from the interactive video casting system, wherein offering the coupon includes providing a plurality of features related to transactions that can be conducted in connection with any of the coupons available from the coupon channel, and wherein offering the coupon comprises filtering the triggers to prevent offering of coupons from merchants not listed on a participating merchant list;
responsive to a command received from a user input device that is in communication with the client terminal, displaying the offered coupon on the coupon channel via the display screen, conducting a transaction related to the offered coupon, the client terminal capable to correlate the received command with the offered coupon and to initiate the transaction subsequent to correlation of the received command with the offered coupon; and
providing an electronic notification related to the offered coupon from the interactive video casting system subsequent to conducting the transaction, the electronic notification capable of being provided to the client terminal for display on the display screen, the electronic notification further capable of being provided on one of the channels of the interactive video casting system that is different from the coupon channel.

30. The method of claim 29 wherein offering the coupon comprises offering the coupon during a television program that is presented on a channel different from the coupon channel.

31. The method of claim 29 wherein the notification is capable of being provided to a device different from the client terminal.

32. The method of claim 29 wherein the plurality of features related to transactions includes at least one of a feature to send one of the selected coupons to another user, a feature to print one of the selected coupons, a feature to save one of the selected coupons in the personal storage location, or a feature to redeem one of the selected coupons with one of the subscribed merchants.

* * * * *